Sept. 17, 1968 R. F. GIBB 3,402,301
LOAD RESPONSIVE INVERTER
Filed Nov. 4, 1964
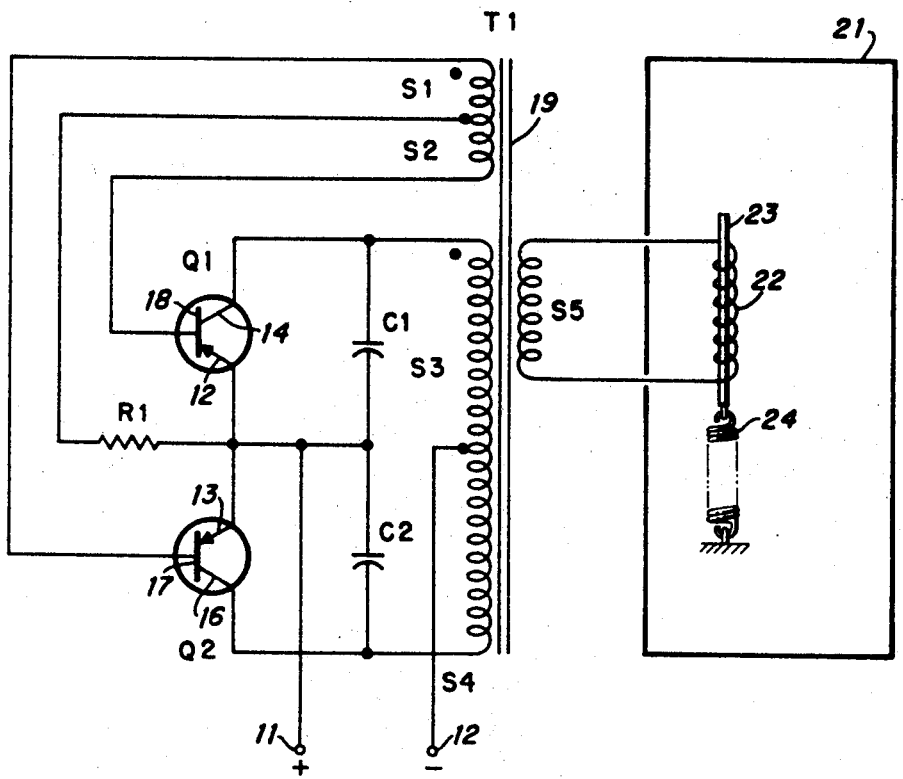
INVENTOR.
ROBERT F. GIBB
BY
Richard K. MacNeill United States Patent Office 3,402,301
Patented Sept. 17, 1968

3,402,301
LOAD RESPONSIVE INVERTER
Robert F. Gibb, 545 N. Granados,
Solano Beach, Calif. 92075
Filed Nov. 4, 1964, Ser. No. 408,917
2 Claims. (Cl. 307—104)

ABSTRACT OF THE DISCLOSURE

A load responsive inverter includes an output transformer coupled for driving a mechanical resonant load. The transformer includes a pair of feedback windings connected to the bases of two transistors which are driven into saturation and cutoff alternately as determined by the reflected impedance from the mechanical resonant load.

---

The present invention relates to a load responsive inverter and more particularly to a load responsive inverter which automatically drives a resonant load substantially at its resonant frequency.

In the prior art, where it is necessary to drive a resonant load, either electrical or mechanical, great care has been required to operate the driving source at the resonant frequency of the load. This is required for the extremely close frequency tolerance necessary on the driving source, which is replete with attendant disadvantages such as high cost, and large maintenance and adjustment requirements. One solution to this problem has been in the use of a coupling loop from the output back to an oscillatory driving source to synchronize the driving source at the natural resonance of the load. This also has resulted in high construction cost, and maintenance and adjustment problems, together with a loss in efficiency.

According to the invention, a free running DC to AC inverter, having transformer coupled feedback, is transformer coupled to a resonant load such as a vibrator. The inverter is of the free running type and has a natural or free running frequency lower than that of the resonant frequency of the load. As the secondary current of the inverter transformer, i.e., load current, tends to increase due to the load being driven off resonance, the reflected impedance will cause one side of the inverter to saturate, resulting in a reversal of phase of the inverter which in effect synchronizes the inverter frequency to the natural resonance frequency of the load. This obviates the necessity of the expensively constructed inverters or AC power supplies having very close frequency tolerances and furthermore, renders the inverter capable of operating efficiently over a range of frequencies which will accommodate loads having various resonant frequencies. The only requirement in the instant invention is that the natural free running frequency of the inverter be lower than the resonant frequency of the load.

It is an object of the present invention to provide a DC to AC inverter for driving a mechanically or electrically resonant load which will automatically drive the load at its resonant frequency.

A further object of the invention is to provide a load responsive DC to AC inverter for driving a resonant load which is efficient and requires a minimum of maintenance and adjustment.

Another object of the invention is the provision of a responsive DC to AC inverter for driving a resonant load which is relatively inexpensive and utilizes a minimum of components.

Other objects and many of the attendant advantages of this invention will be readily appreciated as the same becomes better understood by reference to the following detailed description when considered in connection with the accompanying drawing in which the sole figure is a schematic representation of the preferred embodiment of the instant invention.

Referring to the drawing, positive supply input terminal 11 is connected to emitters 12 and 13 of transistors $Q_1$ and $Q_2$, respectively, and through resistance $R_1$ to a center tap separating windings $S_1$ and $S_2$ of transformer $T_1$. Negative power supply input terminal 12 is connected to a center tap separating windings $S_3$ and $S_4$ of transformer $T_1$. The other side of winding $S_3$ is connected to collector 14 of transistor $Q_1$ and through capacitor $C_1$ to input terminal 11. The other side of winding $S_1$ is connected to base 17 of transistor $Q_2$ and the other side of winding $S_2$ is connected to base 18 of transistor $Q_1$. Secondary winding $S_5$ is connected to resonant load 21 having a solenoid or magnet coil 22 with a drive shaft 23 mounted therein and spring loaded by spring 24. Windings $S_1$, $S_2$, $S_3$, $S_4$ and $S_5$ of transformer $T_1$ are all magnetically coupled to core 19.

OPERATION

If the inverter circuit shown in the drawing and described above were connected to a resistive load, it would function as follows: A direct current source connected at terminals 11 and 12 would initially charge capacitances $C_1$ and $C_2$. The charging currents would be in one direction in winding $S_3$ and in the opposite direction in winding $S_4$ and if the capacitances were exactly equal as well as windings $S_3$ and $S_4$ the flux resulting therefrom would cancel. To insure that this does not happen capacitances $C_1$ and $C_2$ are of different capacities resulting in unequal currents through windings $S_4$ and $S_3$. The windings $S_1$ and $S_2$ are connected to the transistor bases and phased such that more current in $S_3$ causes transistor $Q_1$ to turn on and $Q_2$ to turn off with the reverse condition when the current is through $Q_2$ causing sustained free running oscillations.

Since neither transistor is conductive when the input power is initially applied, the current induced into $S_1$ and $S_2$ is necessary to start oscillations. Once one transistor is conducting, it remains conducting due to the positive feedback phasing arrangement of $S_1$ and $S_2$. This will continue until the conductant transistor is in a condition of collector current saturation. At this time the voltage across the conducting transistor will increase leaving less voltage across the transformer winding. Less voltage across its transformer winding causes a decreasing voltage on its feedback winding which further increases the voltage drop across the transistor and the process is continued until that transistor is cut off and the other transistor is turned on. This changeover is very rapid due to the chain reaction effect once a trend is started. The rate of frequency at which this occurs is determined by the volt-second product characteristics of transformer $T_1$ and is directly proportional to the applied voltage at input terminals 11 and 12.

Since it is imperative to drive a resonant load at its resonant frequency for proper operation at highest efficiency, an inverter operating in the mode described above would function well at only one exact input voltage, i.e., frequency. It has been found, however, that when connected to a resonant load that has a resonant frequency higher than the free running frequency of the inverter for any desired input voltage, the inverter will lock in on the natural resonant frequency of the resonant load.

In this instance, the rising current caused by the transformer core 19 saturation does not occur because the resonant load 21 reflects a rising current at the end of each half cycle. This occurs because the moving mass or drive shaft 23 in the resonant load has reversed its direction, and the load is generating an adding current to the supplied current from output winding $S_5$. This rising current starts the same series of events as described earlier causing the transistor inverter to switch because of the reversed feedback in windings $S_1$ and $S_2$. The same theory holds when the inverter is used to drive an electrically resonant load.

Capacitors $C_1$ and $C_2$ also present a low impedence to transient voltage spikes and inductive currents due to the reactive load.

It should be understood, of course, that the foregoing disclosure relates to only a preferred embodiment of the invention and that it is intended to cover all changes and modifications of the example of the invention herein chosen for the purposes of the disclosure which do not constitute departures from the spirit and scope of the invention.

What is claimed is:

1. A load responsive DC to AC inverter for driving a mechanically resonant load comprising:
   (a) a free-running DC to AC inverter having an output and a feed-back input;
   (b) a transformer having a primary winding connected to said inverter output, a feedback winding connected to said inverter feedback input, and an output winding; and
   (c) a mechanically resonant load connected to said output winding, said mechanically resonant load having a resonant frequency higher than the free running frequency of said inverter.

2. The load responsive DC to AC inverter of claim 1 wherein said free running DC to AC inverter comprises:
   (a) first and second transistors each having base, collector and emitter elements;
   (b) said collector elements coupled to said transformer primary winding;
   (c) said base elements coupled in opposite phase relationship to said transformer feedback winding; and
   (d) said emitter and collector elements adapted to be coupled to a source of DC potential.

References Cited

UNITED STATES PATENTS

| | | | |
|---|---|---|---|
| 2,976,461 | 3/1961 | Dilger et al. | 331—114 X |
| 2,994,023 | 7/1961 | Devol | 318—138 |
| 3,034,073 | 5/1962 | Newell et al. | 331—114 |
| 3,149,274 | 9/1964 | Hetzel | 319—138 X |
| 3,229,178 | 1/1966 | Favre | 318—138 |
| 3,250,066 | 5/1966 | Engelhardt et al. | 318—329 X |
| 2,769,946 | 11/1956 | Brailsford | 318—128 |
| 2,848,672 | 8/1958 | Harris | 318—118 |
| 3,151,284 | 9/1964 | Kleesattel | 318—118 |

ORIS L. RADER, *Primary Examiner.*

W. E. DUNCANSON, *Assistant Examiner.*